US010002094B2

United States Patent
Aue et al.

(10) Patent No.: US 10,002,094 B2
(45) Date of Patent: Jun. 19, 2018

(54) METHOD FOR PROVIDING A GENERIC INTERFACE AND MICROCONTROLLER HAVING A GENERIC INTERFACE

(71) Applicant: Robert Bosch GmbH, Stuttgart (DE)

(72) Inventors: Axel Aue, Korntal-Muenchingen (DE); Eugen Becker, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 733 days.

(21) Appl. No.: 14/288,028

(22) Filed: May 27, 2014

(65) Prior Publication Data

US 2014/0359180 A1     Dec. 4, 2014

(30) Foreign Application Priority Data

May 29, 2013 (DE) .................. 10 2013 210 062
May 31, 2013 (DE) .................. 10 2013 210 182

(51) Int. Cl.
*G06F 13/24* (2006.01)
*G06F 13/40* (2006.01)

(52) U.S. Cl.
CPC ................ *G06F 13/4004* (2013.01)

(58) Field of Classification Search
CPC ....................................... G06K 15/102
See application file for complete search history.

(56) References Cited

U.S. PATENT DOCUMENTS

| 5,491,713 A * | 2/1996 | Kwok .......... H04L 7/0331 |
| | | 329/304 |
| 6,847,615 B1 * | 1/2005 | Walter ....... H04L 25/0262 |
| | | 370/252 |
| 8,484,383 B2 | 7/2013 | Hartwich et al. |
| 2005/0021874 A1 * | 1/2005 | Georgiou ........ G06F 15/167 |
| | | 709/250 |
| 2009/0125592 A1 | 5/2009 | Hartwich et al. |
| 2013/0111189 A1 | 5/2013 | Boehl et al. |

OTHER PUBLICATIONS

"16/32-Bit Architecture, XC2387C, XC2388C, 16/32-Bit Single-Chip Microcontroller with 32-Bit Performance, XC2000 Family / High Line, Data Sheet V1.3 Jul. 2011" from Infineon.

* cited by examiner

*Primary Examiner* — Henry Tsai
*Assistant Examiner* — Juanito Borromeo
(74) *Attorney, Agent, or Firm* — Norton Rose Fulbright US LLP; Gerard Messina

(57) ABSTRACT

A microcontroller for a control unit, in particular for a vehicle control unit, includes a central processing unit (CPU), at least one interface-unspecific input module, at least one interface-unspecific output module, at least one routing unit and at least one arithmetic unit for processing interface-specific information. The microcontroller is configurable in such a way that the at least one interface-unspecific input module, the at least one interface-unspecific output module, the at least one routing unit and the at least one arithmetic unit for processing interface-specific information fulfill functions corresponding to one of multiple serial interfaces, in particular of SPI, UART, LIN, CAN, PSI5, FlexRay, SENT, IC2, MSC or Ethernet. In addition, the input module stores an entire input message frame of the input data and makes this available to the arithmetic unit or the central processing unit (CPU).

34 Claims, 11 Drawing Sheets

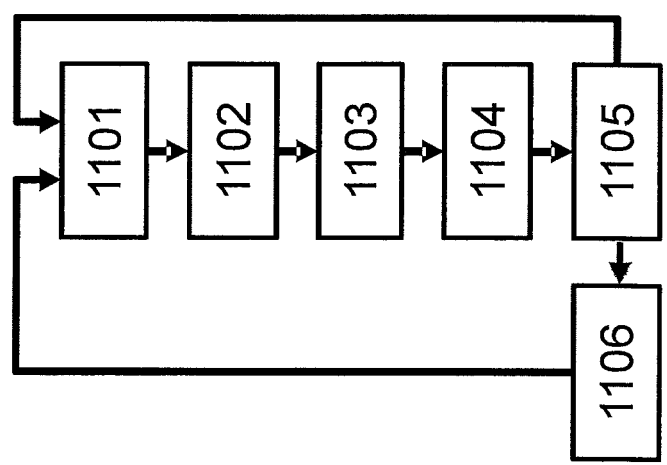

METHOD FOR PROVIDING A GENERIC INTERFACE AND MICROCONTROLLER HAVING A GENERIC INTERFACE

RELATED APPLICATION INFORMATION

The present application claims priority to and the benefit of German patent application no. 10 2013 210 262.0, which was filed in Germany on May 29, 2013, and German patent application no. 10 2013 210 182.1, which was filed in Germany on May 31, 2013, the disclosures of which are incorporated herein by reference.

FIELD OF THE INVENTION

The present invention relates to electronic control units, in particular for controlling functions in a vehicle, which have interfaces to the outside for communicating with other users of a communication system.

BACKGROUND INFORMATION

Control units in a vehicle customarily have serial interfaces such as SPI, UART, LIN, CAN, PSI5, FlexRay, SENT, I2C, MSC (Micro Second Channel), Ethernet and others for connecting to or communicating with other control units, sensors, actuators or other peripheral devices. According to the related art, these serial interfaces are implemented with the aid of a VHDL code in a microcontroller of the control unit. In terms of hardware, depending on the interface, e.g., an interface-specific communication controller, including protocol controller, sample unit, memory unit and transceiver (transmitter/receiver) must be implemented for the implementation of a serial interface. A bus transceiver is not necessary with SENT and SPI, for example. Interface-specific hardware units (e.g., buffer with SPI, protocol controller with CAN) make such an implementation additionally complex and inflexible.

From WO-2006013212 A1, for example, the implementation of a FlexRay communication module for coupling a FlexRay communication link to a user assigned to the FlexRay communication module in a FlexRay network is understood. A microcontroller having a typical configuration of serial interfaces is discussed, for example, in the document "16/32-Bit Architecture, XC2387C, XC2388C, 16/32-Bit Single-Chip Microcontroller with 32-Bit Performance, XC2000 Family/High Line, Data Sheet V1.3 2011-07" from Infineon.

The requirements in regard to the type and number of serial interfaces in different vehicle applications for a control unit or for a microcontroller of such a control unit vary greatly. For example, the requirement in one application may read: one SPI interface, two LIN interfaces, 5 CAN interfaces. In another more demanding application, further interfaces such as FlexRay or Ethernet may additionally be required, or a higher number of existing interfaces must be present. To address this, a microcontroller having a very large number of interfaces of different types may be used; however, this microcontroller would be over-engineered for a large number of applications, and thus too expensive. As an alternative, a specific microcontroller having exactly the desired number of each interface type may be implemented for each application; however, this is inconsistent with the desire for standardization and results in high implementation costs. Both approaches are additionally inflexible for still unknown future requirements. Overall, the interface-specific hardware implementation of the serial interfaces in a microcontroller for a vehicle control unit thus results in inflexible approaches, which are adaptable to different requirements only with complexity.

SUMMARY OF THE INVENTION

The present invention is directed to a method for providing at least one generic interface, a corresponding microcontroller and a control unit having such a microcontroller.

A flexible configuration of a microcontroller includes a central processing unit (CPU), an interface-unspecific input module, an interface-unspecific output module, a routing unit, and an arithmetic unit for processing interface-specific information. The arithmetic unit may be not identical to the central processing unit. The described circuit parts of the microcontroller are configurable as a generic interface in such a way that, depending on the configuration, they are able to provide functions corresponding to one of multiple serial interfaces, in particular of SPI, UART, LIN, CAN, PSI5, FlexRay, SENT, I2C, MSC or Ethernet.

Microcontrollers often must have a broad range of applications since their configuration and production costs are high, and it is thus not possible to develop a dedicated microcontroller for every application. Due to the proposed provision of generic interfaces in the microcontroller, it is not necessary when designing the microcontroller to know the number of each type of interface required in different applications of the microcontroller. Rather, hardware circuits are provided which, depending on the configuration, fulfill the tasks of a certain serial interface.

In one method for providing generic interfaces by hardware circuits of a microcontroller, input data are received via an interface-unspecific input module in a generally separate submethod for receiving and for processing input data according to a protocol of the one of multiple serial interfaces and are transmitted to an arithmetic unit. The arithmetic unit extracts payload data from the input data, in particular by removing specifics of the protocol from the input data. The first payload data are finally made available to the central processing unit (CPU).

In one generally separate submethod for processing data and sending output data, second payload data of the central processing unit are received by an arithmetic unit. The arithmetic unit generates output data from the second payload data, in particular by adding specifics of the protocol to the second payload data. The output data are transmitted via the routing unit to one of the interface-unspecific output modules and finally sent via an interface-unspecific output module corresponding to the protocol of the one of the multiple serial interfaces.

This method represents a particularly flexible way of data processing since no interface-specific hardware units are used. The data of a large number of protocols of a corresponding large number of serial interfaces may be received and sent by the interface-unspecific input and output modules, and the received data may be evaluated in the arithmetic unit based on protocol information with the aid of the configuration. This allows the generic interfaces to be configured corresponding to certain serial interfaces, depending on the application-specific requirements in regard to the microcontroller.

The protocol specifics, in particular information about start bits, stop bits, parity information, control bits, stuffing bits or the like, may be stored in a memory, e.g., by the central processing unit of the microcontroller. The generic interface, in particular the arithmetic unit used for this purpose, may thus be configured. The arithmetic unit has access to the memory and is able to read the protocol information according to the provided configuration.

An even broader field of use results for the generic interfaces when the arithmetic unit is also used for calculations of higher protocol layers. It may carry out the conversions of multiple UART message frames into one LIN message frame, for example.

The forwarding of payload data from the arithmetic unit to the central processing unit is implemented the simplest by the arithmetic unit writing the payload data into a memory to which the central processing unit has access and accordingly informing the central processing unit, e.g., with the aid of an interrupt.

In one more complex variant, however, which relieves the arithmetic unit and the central processing unit, the arithmetic unit may make the payload data available to the central processing unit via direct memory access.

The input module may store entire messages and make these available to the arithmetic unit (which may be via the routing unit). For this purpose, it requires access to memory resources which are sufficient to store an entire message frame. Since the input module, in combination with the other hardware circuits, is to be used to provide different serial interfaces by the generic interface, the memory must be sufficient to be able to store an entire message frame of each protocol corresponding to the interfaces which are to be potentially provided. If the entire message frame is transmitted via the routing unit, the load on this unit is less than in the case of a separate transmission of individual message components. As a result, the transmission is not determined as strongly by the speed and the load of the routing unit, and higher data rates for the received data are possible.

The entire message may be assigned a piece of time information by the input module. This may once again be used by the arithmetic unit or the central processing unit for classifying or processing the input data.

In addition, particularly reliable detection of the content of the input data by the input module may take place if this content is analyzed by oversampling and a bit level for each bit of the input data is determined from the level values of the sampling points by majority voting.

In one method for outputting data, the arithmetic unit processes payload data from the central processing unit by converting these into edge changes having assigned time stamps. For this purpose, the arithmetic unit must know the corresponding baud rate for intervals of the edge changes with which output data are to be output, i.e., the data transmission rate at output. Each edge change having a time stamp is transmitted separately via a routing unit to an output module. With the aid of a comparison to time information, each edge change is applied to the output there at the desired time. This allows a flexible and protocol-independent data output using an interface-unspecific output module.

As an alternative, it is also possible for an entire message frame instead of individual level changes having time stamps to be made available by the arithmetic unit to the output module during output. The entire message frame is then output, for example, with the aid of a trigger by the arithmetic unit or the central processing unit or when a time stamp of the entire message frame agrees with a piece of time information in the output module. This relieves the routing unit, and the transmission speed is limited less by the load and speed of the routing unit.

The arithmetic unit includes an arithmetic logic unit, for example; it may be implemented as a multi channel sequencer.

A microcontroller, in which the interface-unspecific output module has a compare functionality, may provide generic interfaces in a particularly flexible and easily implementable way. A considerably higher flexibility of the microcontroller may be achieved using fewer resources.

The options for use of the microcontroller may be expanded by additional separate hardware circuits, for example for CRC calculations or calculations as part of a bus arbitration (for example, with CAN), which either form an integral part of the microcontroller or are connected to the same. Such hardware units which are optimized for a certain function relieve the less specialized remaining modules, in particular the arithmetic unit of the microcontroller. Some calculations and thus applications of the microcontroller are only possible at the required reliability and speed when using such additional units.

For the generic interfaces to provide the serial interfaces in each case within a scope as they are common in many applications, in particular in the automotive field, the routing unit and/or the arithmetic unit should be operated at a clock of at least 100 MHz, in particular at a clock of at least 200 MHz, and thus it should be possible to receive input data at an input baud rate of at least 1 Mbaud and to send output data at an output baud rate of at least 1 Mbaud.

Very flexibly usable, while nonetheless being particularly inexpensive, is a microcontroller which includes both specific interfaces implemented in hardware and generic interfaces having interface-unspecific hardware, which may be configured to provide desired interfaces using software calculations. For the known applications of the microcontroller, a certain intersection of interfaces between the applications may thus be fixedly implemented, while different interface requirements between the applications or still unknown interface requirements are covered by generic interfaces.

Hardware circuits may be combined with one or multiple timer modules to provide generic interfaces in a microcontroller. These may also flexibly support each other in tasks if corresponding capacities are available in one of the hardware blocks.

The described microcontrollers are usable particularly well in control units, in particular in the automotive field. Here, the requirements in regard to interfaces are particularly high, while cost objectives are strict at the same time.

The present invention is described in greater detail hereafter with reference to the accompanying drawings and based on exemplary embodiments.

BRIEF DESCRIPTION OF THE DRAWINGS

FIG. 11 schematically shows the exemplary sequence of a data transmission with CRC calculation by a separate CRC unit.

DETAILED DESCRIPTION

Figure 1:
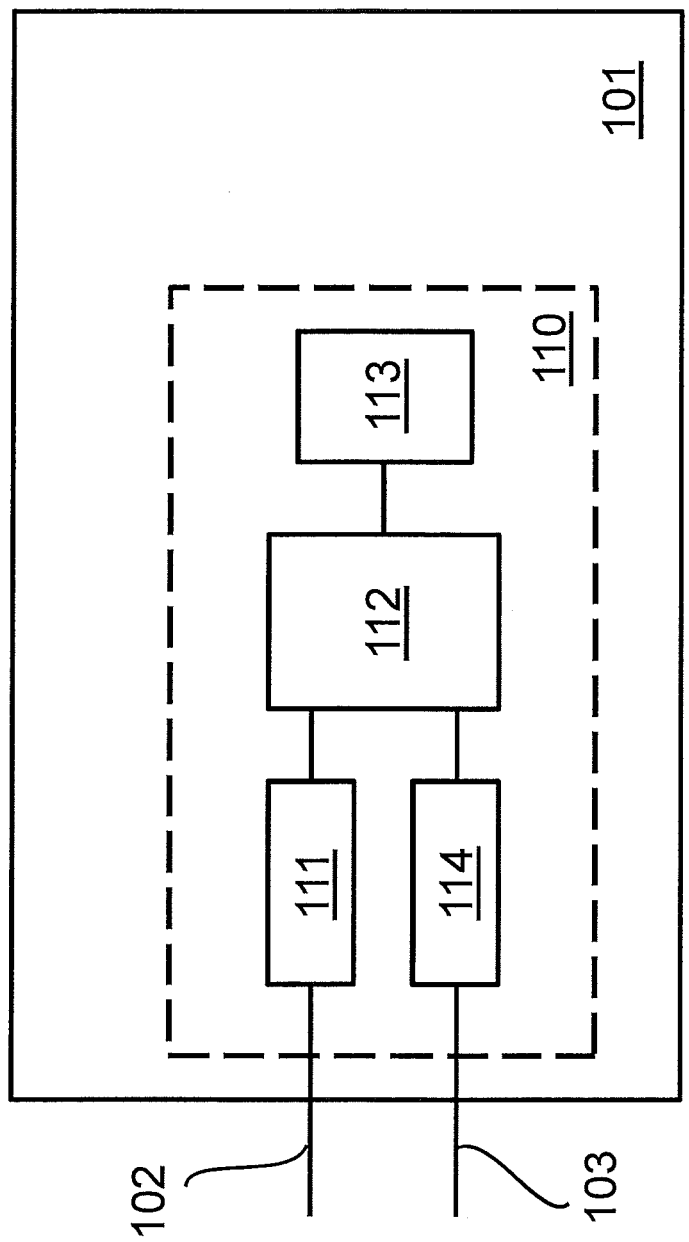
FIG. 1 schematically shows an exemplary microcontroller including hardware circuits for providing generic interfaces.

The term "serial interface" hereafter shall be understood to mean a connection for the serial data exchange between devices. Serial data transmission denotes a data transmission in which the bits are consecutively transmitted via one line or multiple lines. Serial interfaces used in vehicles include SPI, UART, LIN, CAN, PSI5, FlexRay, SENT, I2C, MSC and Ethernet, for example.

The "Generic Timer Module (GTM)" is the timer module from WO-2011120823 A1. Hardware submodules are situated in this timer module around a central routing unit (referred to as "Advanced Routing Unit (ARU)"). The central routing unit routes data between the different hardware submodules; in this process, a "round robin" scheduling may be used for deterministic arbitration. This means that source modules are operated within a maximum round trip time and their data are routed via address information to the corresponding destination modules. The timer module is thus able to reduce the interrupt load of the CPU of a microcontroller, e.g., in microcontrollers for electronic control units (ECU) which are used to control functions in vehicles. Some of the hardware submodules that the timer module has include input modules, the so-called "Timer Input Modules (TIM)," and output modules, the so-called "Timer Output Modules (TOM)" or also "ARU-connected Timer Output Modules (ATOM)." In addition to the routing unit (ARU), the input modules (TIM) and the output modules (ATOM), the timer module also has a multi channel sequencer as an arithmetic unit.

The timer module resorts to the basic "capture/compare" principle. Signals having time stamps arriving in the input units (TIM) are concatenated according to their arrival. The input unit (TIM) receives the corresponding time information from a time base unit (TBU), for example. This functionality of the time stamp corresponds to the "capture" of the "capture/compare." Signals which are to be sent via the output units (ATOM) of the timer module are also provided with time stamps, e.g., by the processing arithmetic units (CPU, MCS). The time stamps of the signals are compared to instantaneous time information in the output module (ATOM) of the timer module. The output module receives this information also from a time base unit, for example. If the time stamp of the signal to be output corresponds to the present time, the signal is sent. This functionality corresponds to the "compare" of the "capture/compare." Instead of the described time base, it is also possible to implement angular synchronous "capture/compare" functions with the aid of the input and output units. These may be required in the vehicle since the angular position of a receiving or sending process relative to the instantaneous engine angle is of particular importance. For example, the input unit may provide incoming signals with angle stamps, and outgoing messages may be sent at certain angle points.

The arithmetic unit or data processing unit "Multi Channel Sequencer (MCS)" may be implemented as a submodule having pipeline stages, an arithmetic logic unit (ALU), decoders and a link to RAM memory units. It is also possible to use multiple multi channel sequencers in a timer module. The input units may be implemented as a hardware component having latches and flip flops and a link to a time- and/or angle-sensing unit. The output units may be implemented as a hardware component having latches and flip flops, which form a register, for example, and a link to a time- and/or angle-sensing unit. The time basis for time-dependent functions may be derived from the processor clock of the microcontroller (or its central processing unit (CPU)); the angle basis for angle-dependent functions may be implemented via a digital phase-locked loop (DPLL).

Reference is made to WO-2011120823 A1 regarding the further operating mode of the timer module, in particular of the described components ARU, MCS, TIM, ATOM, TBU of the timer module. The corresponding passages of the description of WO-2011120823 A1 are hereby incorporated by reference into the present application.

Based on the functionality of the known timer module, one central aspect of the present invention is to provide generic serial interfaces in a microcontroller, in particular for use in vehicle control units. For this purpose, either units of a corresponding timer module which is already integrated into the microcontroller may be reconfigured, or units may be integrated into the microcontroller specifically for this use. For example, "compare" functionalities of the output units (TOM, ATOM) may be resorted to for generically emulating specific interface outputs. The input and output units are supported by an arithmetic unit, such as a multi channel sequencer (MCS) which carries out calculations for providing an interface. A routing unit may be used to distribute data between the input modules, output modules and the arithmetic unit. The modules described hereafter, i.e. input module, output module, routing unit and arithmetic unit, which may be have the functionalities of the corresponding units TIM, A(TOM), ARU and MCS which are described above with regard to the "GTM" timer module. However, the hardware circuit for the provision of generic interfaces or the microcontroller having this hardware circuit differs from the known timer module due to the different requirements (e.g., speed of the routing and of the processing). Using the above-described functions of the timer submodules, it may be also possible to carry out changes in the hardware of the microcontroller; however, at least the corresponding timer hardware components must be adapted to the changed tasks and requirements with the aid of configuration to be usable according to the present invention.

FIG. 1 schematically shows a circuit configuration for providing a generic, serial interface in a microcontroller.

Microcontroller 101 includes a group of hardware circuits 110, which configurably provide the functions of a certain serial interface. Hardware components 110 include an input module 111 which is connected to an input data channel 102. Input data channel 102 is typically a wired communication link. Input module 111 is connected to a routing unit 112. In addition to input module 111, routing unit 112 is also connected to an arithmetic unit 113 and an output module 114. Output module 114 is connected to an output data channel 103. Output data channel 103 is typically also a wired communication link. Input data channel 103 and output data channel 104 form part of a communication system using a certain protocol, so that interface-unspecific hardware components 111, 112, 113, 114 must be configured in such a way that they provide the functions of the corresponding interface which is able to process data of this particular protocol. For example, input data channel 102 may be an Rx input of a UART interface and output data channel 103 may be a Tx output of a UART interface. Hardware components 111, 112, 113, 114 must be configured in this example in such a way that they emulate a UART interface.

Input module 111 and output module 114 are interface-unspecific hardware circuits, i.e., they are able to process data from many different serial interfaces, composed according to different protocol structures. Arithmetic unit 113 must be distinguished from the central processing unit (CPU) of the microcontroller and is referred to hereafter as MCS for distinction, since the arithmetic unit (MCS) in one specific embodiment of the microcontroller is a multi channel sequencer. Other hardware implementations of the arithmetic unit (MCS) are also possible, which may be also having an arithmetic logic unit (ALU).

Routing unit 112 connects input module 111, output module 114 and arithmetic unit (MCS) 113 in a time division multiplex manner.

FIG. 1 shows a highly simplified illustration of microcontroller 101. Such a microcontroller 101 of course has many other components which are not shown here, among other things at least one central processing unit (CPU), which is able to carry out data processing operations, calculations and configurations in the microcontroller. In addition, microcontroller 101 may include multiple such input modules 111 and output modules 114. Depending on the application, it may also include multiple arithmetic units (MCS) 113. Many such modules 111, 113, 114 may be connected to a single routing unit 112. It is also possible to use multiple routing units 112 in such a microcontroller 101 for very complex applications.

In one particular variant of the present microcontroller, the same has a number of "genuine" serial interfaces, which are implemented fixedly in hardware according to the related art, and a number of "generic" interfaces in the form of hardware circuits as described for FIG. 1. In this way, it may be possible to advantageously implement the minimum number of required interfaces of one particular interface type fixedly in hardware as in the past, while the interfaces which differ among different applications of the microcontroller may be provided as generic interfaces and may thus be configured corresponding to the particular use in software. A flexible use of the microcontroller is thus possible at a reduced number of interfaces which must be made available.

Contrary to the input modules of the Generic Timer Module, the input module may also do without the capture functionality. This is because the special input module which is provided for emulating generic interfaces receives entire message frames, stores these, and makes them available to the arithmetic unit (MCS) or the central processing unit (CPU).

Such a special input module may also receive (i.e., store) and additionally filter an entire bit stream. Oversampling may be used as filtering. Oversampling in combination with voting, for example, allows the received bits having high levels and the received bits having low levels to be separated or distinguished more reliably from each other.

The input filter of the special input module is programmable, for example, in such a way that it samples a 1 MHz signal at 16 MHz. The 16 samplings per bit are then routed via a voting instance which stores a 1 or 0 as the bit state according to predefined settings (e.g., 3 out of 16 or 12 out of 16). As a result of such a special input module, in which oversampling and voting are implemented, it is also possible to implement interfaces having higher requirements in regard to interference resistance.

Due to the synchronization with a trigger event, such as a start bit in the case of UART, the special input unit may be brought into a defined state in relation to the bit stream. When all bits are read in (e.g., UART: start bit, 8 data bits, parity bit, stop bit), these data are transmitted from the output of the special input module via the routing unit to the arithmetic unit (MCS), which then compiles higher protocol layers (e.g., KWP2000, LIN), for example, or writes the data directly into a FIFO memory from which the application software is able to retrieve the data. The arithmetic unit (MCS) receives the data of a message frame as a single message from the routing unit. This relieves the routing unit from having to carry out many individual transmissions of individual components of the message frame. The speed of processing incoming data is not highly dependent on the speed of the routing unit. In addition to relieving the routing unit and arithmetic unit (MCS), it is possible to process incoming data at a faster data rate.

In addition to the filtered bit levels, i.e., determined to be correct after oversampling and voting, the information as to whether and how much interference on the bits occurred, i.e., how clear the voting was, for example, may be forwarded (e.g., to the arithmetic unit (MCS) or the central processing unit (CPU) of the microcontroller). For example, it may be transmitted how many sampled values of one bit have the same level. To make the voting more robust, it is also possible, for example, to mask out the points (samplings) directly before and directly after an edge change in order to make the voting, i.e., the bit detection, more robust.

To improve the bit detection for the described hardware circuits having the special input module, which carries out oversampling and voting, it is also possible to use an ascertained baud rate for the voting (such a baud rate detection is described in greater detail below).

In one alternative variant of the specific embodiment having the special input module, no transmission takes place via the routing unit, but a direct transmission takes place from the special input module into a memory, such as a FIFO memory, to which the arithmetic unit (MCS) or the central processing unit (CPU) of the microcontroller has access. As an alternative, the arithmetic unit (MCS) or the central processing unit (CPU) could also have direct access to the memory of the special input module.

In one extension of the introduced exemplary embodiments having the special input unit, this unit may issue a time stamp per bit stream or per message frame (this requires access to a piece of time information, e.g., via a time base unit). This time stamp may be used by the arithmetic unit (MCS) or the central processing unit (CPU) of the microcontroller for processing or evaluating the message frame.

Figure 5:
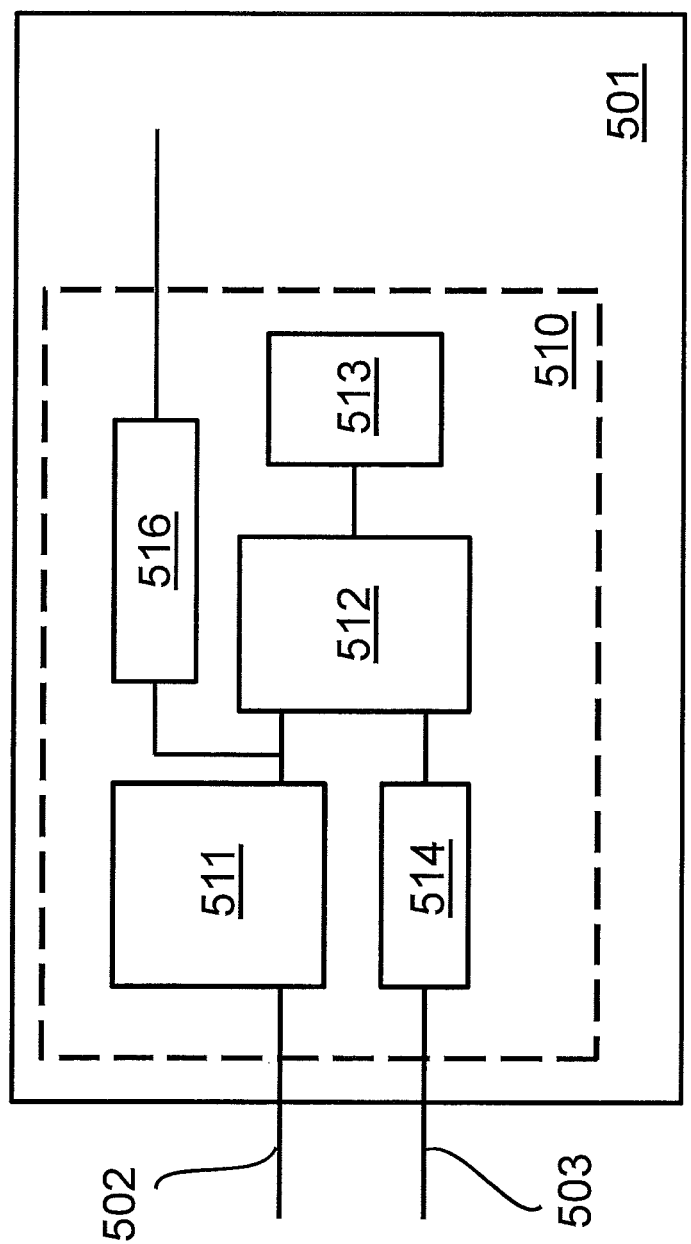
FIG. 5 schematically shows an exemplary microcontroller including hardware circuits for providing generic interfaces and a special input module and an additional memory.

A hardware circuit for providing generic serial interfaces having a special input unit is schematically shown in FIG. 5. Microcontroller 501 including hardware components 510, i.e., input module 511, routing unit 512, arithmetic unit (MCS) 513 and output module 514, as well as the links to data input channel 502 and data output channel 503, once again largely corresponds to microcontroller 101 of FIG. 1. However, deviating from this, special input module 511 is a hardware unit having circuits for providing a filter functionality, in particular an oversampling of received bits and a voting, in which based on the sampled level values at the sampling points of a bit the level value for this bit is established using majority voting. In contrast to the input module which is described for FIG. 1, special input module 511 must include a memory having a sufficient size for storing an entire bit stream or an entire received message frame.

Compared to FIG. 1, FIG. 5 additionally shows a memory 516, such as a FIFO memory. At least input module 511 has access to this FIFO memory. Corresponding to one of the above-described variants, a direct transmission takes place from special input module 511 into memory 516 to which the central processing unit (CPU) of the microcontroller has access, as is indicated in FIG. 5 by the shown link from memory 516 to microcontroller 501.

Figure 8:
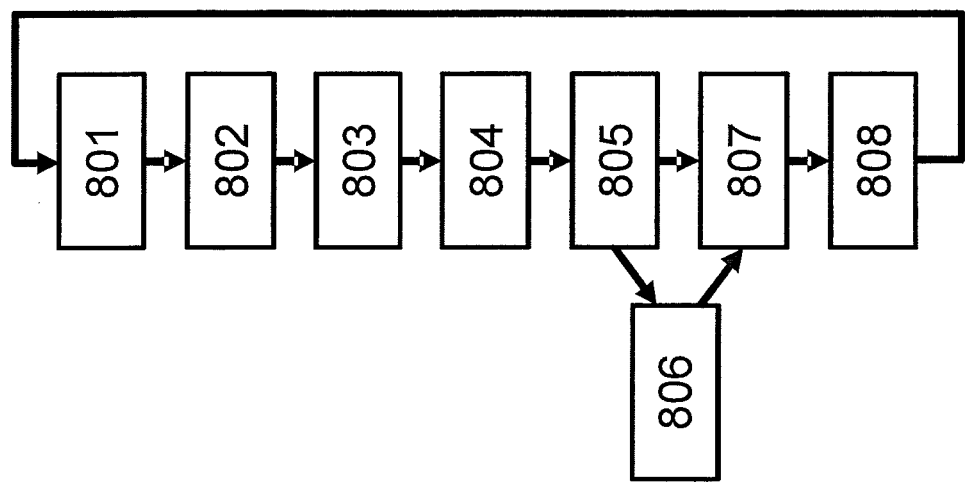
FIG. 8 schematically shows the exemplary sequence of a method for receiving data via a generic interface.

FIG. 8 schematically shows the sequence of a method for providing a generic interface for receiving messages.

In a first step 801, an input module (e.g., 111 in FIG. 1) of a microcontroller receives digital data from outside the microcontroller as bits. An input signal is present at the input module. This signal is present in a protocol corresponding to the serial interface to be emulated.

In step 802, the input module stores the entire bit stream or an entire message frame of the input data. For this purpose, the module must have a sufficiently large memory. The memory may be sufficiently large to store in each case the maximal complete message frames of all protocols according to the interfaces to be potentially emulated.

In step 803, the input module carries out an oversampling, i.e., the received bits are sampled using a multiple clock of the input data rate. As a result, the input module receives multiple level values for each bit corresponding to the detected level at each sampling point. For each bit of the received input data, the input module carries out an analysis or matching based on the level values for this bit at the sampling points. In this process, it is determined which level value (high or low, or dominant or recessive) was detected more frequently for this bit. The value of the bit is then established using this voting.

In step 804, the input module of the arithmetic unit (MCS) makes the input data thus determined available. This may be carried out in a variety of ways, such as via the routing unit, by writing into a memory, or by direct memory access (DMA).

In step 805, the arithmetic unit (MCS) processes the information which it receives in each case in the form of an entire message frame, e.g., via the routing unit. The arithmetic unit (MCS) checks this information and removes control bits (e.g., start bit(s), stop bit(s), parity bit(s), stuffing bit(s)) corresponding to the present protocol. The arithmetic unit (MCS) thus extracts payload data from the message frame. The arithmetic unit (MCS) may receive the information for this processing (i.e., the information about which protocol is involved or how the messages of this protocol are structured) from a local volatile memory to which the unit has access. The information is transmittable to there, for example, from a non-volatile memory (e.g., flash memory) by a central processing unit (CPU) of the microcontroller. When the microcontroller is started, the input module and the output module to which information is still written may be fixedly assigned to a certain message protocol by the central processing unit (CPU), and the information in this regard as well as the corresponding protocol information is stored in a volatile memory accessibly for the arithmetic unit (MCS).

In an optional step 806, the arithmetic unit (MCS) may carry out further processing steps and calculations, such as the calculation of higher protocol layers. For example, multiple UART frames may be converted into one LIN frame, or various signal calculations may be carried out.

The arithmetic unit (MCS) makes the processed information available to a central processing unit (CPU) of the microcontroller in step 807. The information may be stored in a memory (e.g., a RAM) and the central processing unit (CPU) is informed about this (e.g., with the aid of an interrupt or by triggering a DMA channel). In addition to the payload data, the message may include additional information, for example, such as an identifier in the case of a CAN message.

In step 808, the central processing unit (CPU) finally processes the received information.

Figure 9:
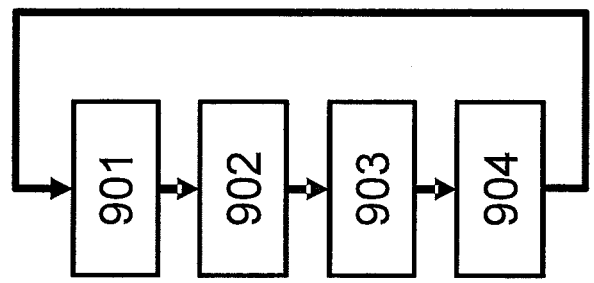
FIG. 9 schematically shows the exemplary sequence of a method for sending data via a generic interface.

FIG. 9 schematically shows the sequence of a method for providing a generic interface for sending messages.

In step 901, a central processing unit (CPU) of a microcontroller makes a signal (if necessary, having an identifier) available to an arithmetic unit (MCS, e.g., 113 in FIG. 1). The arithmetic unit (MCS) processes the signal in step 901. A sequence of edge changes is calculated from the bits of the digital signal, and the edge changes are provided with time information. For the correct time intervals between the edge changes, the arithmetic unit (MCS) requires the information about the baud rate to be used. Moreover, protocol information corresponding to the protocol to be used is added, for example, control bits such as start bit(s), stop bit(s), parity bit(s), and stuffing bit(s). The arithmetic unit (MCS) once again may receive the information for this processing (i.e., the information about which protocol is involved or how the messages of this protocol are structured) from a local volatile memory to which the unit has access. The information is transmittable to there, for example, from a non-volatile memory (e.g., flash memory) by a central processing unit (CPU) of the microcontroller.

The data thus obtained are forwarded by the arithmetic unit (MCS) to a routing unit (e.g., 112 in FIG. 1) in step 902. In subsequent step 903, the data are routed from the routing unit to a predefined output unit (e.g., 114 in FIG. 1).

The output unit thus receives the data to be sent in the form of edge changes, including information about the points in time at which the edge changes are to be applied to which edge at the output, and thus the desired message is sent. For this purpose, the output unit compares the received time information to available time information (compare functionality) in step 904. The time information may be made available by a time base unit, for example. If the time information agrees with the point in time assigned to the subsequent edge change, the output unit finally applies the edge change to the output and thus sends the desired data in the form of a bit stream at the predefined baud rate and in the message protocol corresponding to the serial interface which is to be emulated. The transmission from the arithmetic unit (MCS) via the routing unit to the output module in this embodiment variant takes place separately for each edge change, including the time information. The output module may be configured in such a way that it is only ready to receive another edge change, including the time information, when the previously received edge change has been sent or applied to the output in accordance with the time information.

Different configurations are possible for the hardware implementation of the generic serial interfaces. On the one hand, a microcontroller may have a timer module such as the above-described "Generic Timer Module" and may additionally include hardware circuits such as those described for FIG. 1. In such a configuration, the timer module is able to fulfill the assigned tasks without consideration of interfaces to be provided. The interface functionality is provided by the additional hardware circuits of the microcontroller. In such a configuration, timer functions may be transmittable to the additional hardware circuits with the aid of the configuration, provided that these circuits are not fully utilized by the interface functionalities, in particular provided that the corresponding input and output modules are not assigned to any interface function. In one special variant, the timer module (or its hardware units) may also assume the interface functionality of the additional hardware circuits, provided that the module has sufficient free capacity and a sufficient hardware configuration for this purpose and is configured for this.

Figure 2:
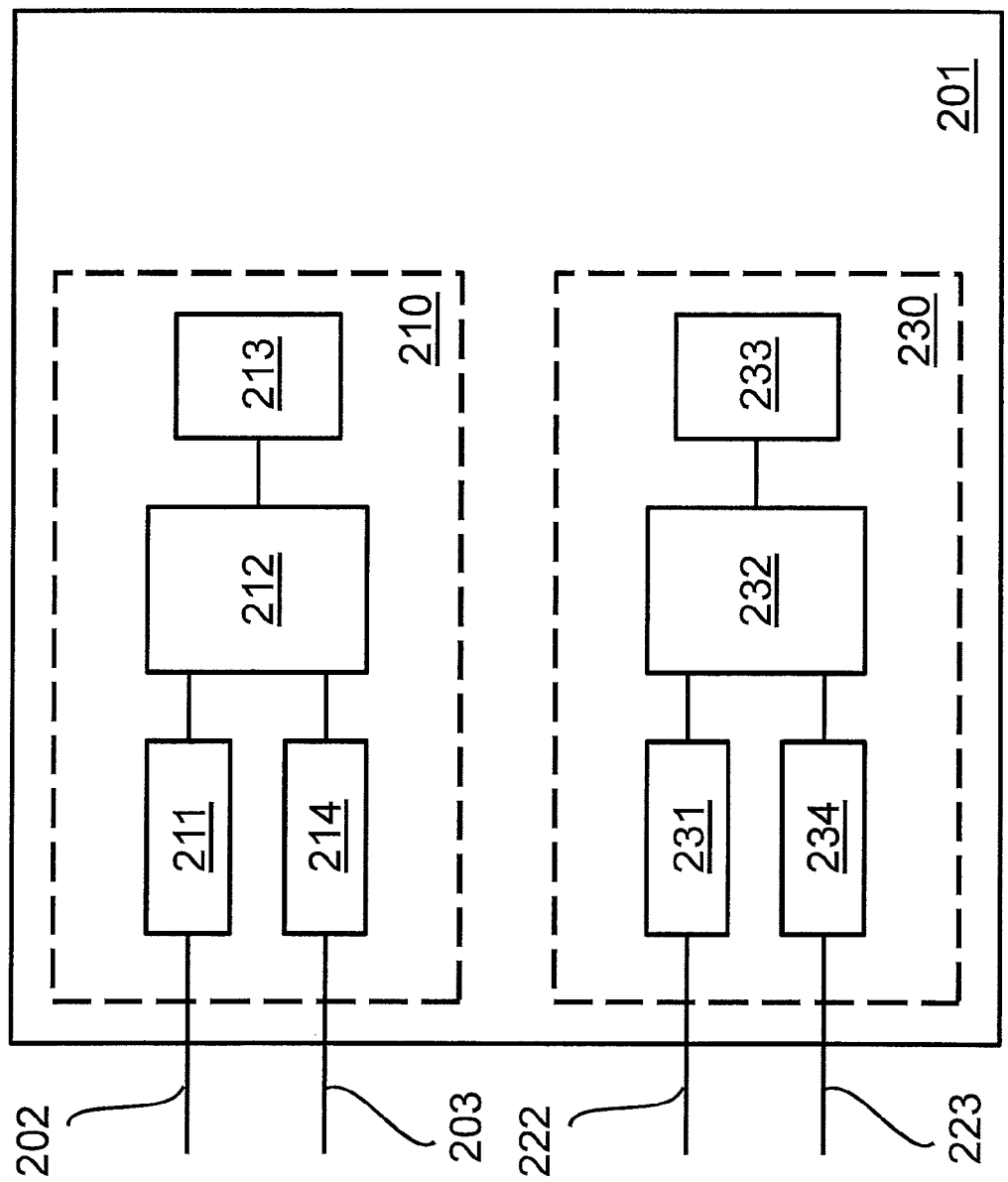
FIG. 2 schematically shows an exemplary microcontroller including hardware circuits for providing generic interfaces and a timer module.

Such a hardware configuration is shown in FIG. 2. Here, microcontroller 201 has a hardware circuit 210, which corresponds to hardware circuit 110 of FIG. 1 (input data channel 202, output data channel 203, input module 211, output module 214, routing unit 212, arithmetic unit (MCS) 213). In addition, microcontroller 201 has a timer module 230, which includes a timer input module 231, a timer output module 234, a routing unit 232 and an arithmetic unit (MCS) 233. Timer input module 231 is connected to signal input 222 and to routing unit 232. Timer output module 234 is connected to signal output 223 and to routing unit 232. Routing unit 232 is additionally connected to arithmetic unit (MCS) 233. For example, timer module 230 may be implemented by the above-described "Generic Timer Module."

In one additional variant, hardware units such as those described for FIG. 1 may assume both the timer and the interface functionality. Compared to the above-described Generic Timer Module, such a hardware unit may have one routing unit or routing units which is/are operated at a higher frequency, as well as fewer modules per routing unit in order to increase the service rate and be able to provide higher baud rates, as they are required for the provisions of generic serial interfaces. For example, the routing unit and the arithmetic unit (MCS) could be operated at frequencies starting at 100 MHz, which may be starting at 200 MHz, instead of at 80 MHz. The frequencies of the routing unit and of the arithmetic unit (MCS) may be configured in such a way that interfaces having 1 Mbaud or higher are providable.

The flexibility increases in both variants due to the possible shift between interface functionality and timer functionality. For example, the timer functions for controlling eight cylinders of an engine may be provided in one application in a control unit having the microcontroller utilizing a combined timer/interface module having 16 output modules. For this purpose, for example, eight output modules having a compare functionality are used to control the ignition, and eight output modules having a compare functional are used to control the injection of one cylinder in each case. If the microcontroller having a combined timer/interface module is used in another application for controlling an engine having four cylinders, eight of the just-described 16 output modules are not required for the timer functions of controlling the cylinders and are thus available, for example to emulate the output signals of eight serial interfaces.

Depending on the type of serial interfaces to be emulated, further hardware components may be required in addition to the afore-described modules and units.

For example, CRC calculations must also be carried out for certain protocols, such as for PSI5 or CAN. During the cyclic redundancy check (CRC), a check value is ascertained for data, and this check value is verified after transmission based on the transmitted data in order to detect transmission or storage errors. The implemented arithmetic unit (MCS) is not optimal for this type of calculations and would have to be equipped with higher computing power, if necessary. In the case of a hardware circuit having multiple arithmetic units (MCS), each of these arithmetic units (MCS) would be given the added load of these additional calculations. Moreover, the CRC calculations must be carried out very quickly with some protocols to be able to trigger actions in the protocol, if necessary, such as error message frames.

For space and performance reasons, it is therefore advantageous to carry out the CRC calculations in a dedicated module. In one embodiment of the above-described hardware circuits for emulating serial interfaces, these additionally include a separate unit for calculating CRC information. In the case of a hardware circuit having multiple arithmetic units (MCS), this CRC checking unit may carry out the calculations centrally for multiple or all these arithmetic units (MCS).

The additional CRC unit is able to make the CRC calculations and CRC comparisons quickly enough even for protocols having high requirements in regard to speed. The CRC unit may carry out at least the calculation of CRC check values, and if necessary also verifies CRC check values. Should a CRC check value be detected as not being correct by the CRC unit, a new transmission may be initiated by the arithmetic unit (MCS).

The CRC checking unit may be implemented as a hardware logic circuit, for example, it may include an XOR gate and a shift register for this purpose. An alternative to this would be an implementation in software with calculation by one (e.g., small additional) arithmetic unit.

Figure 3:
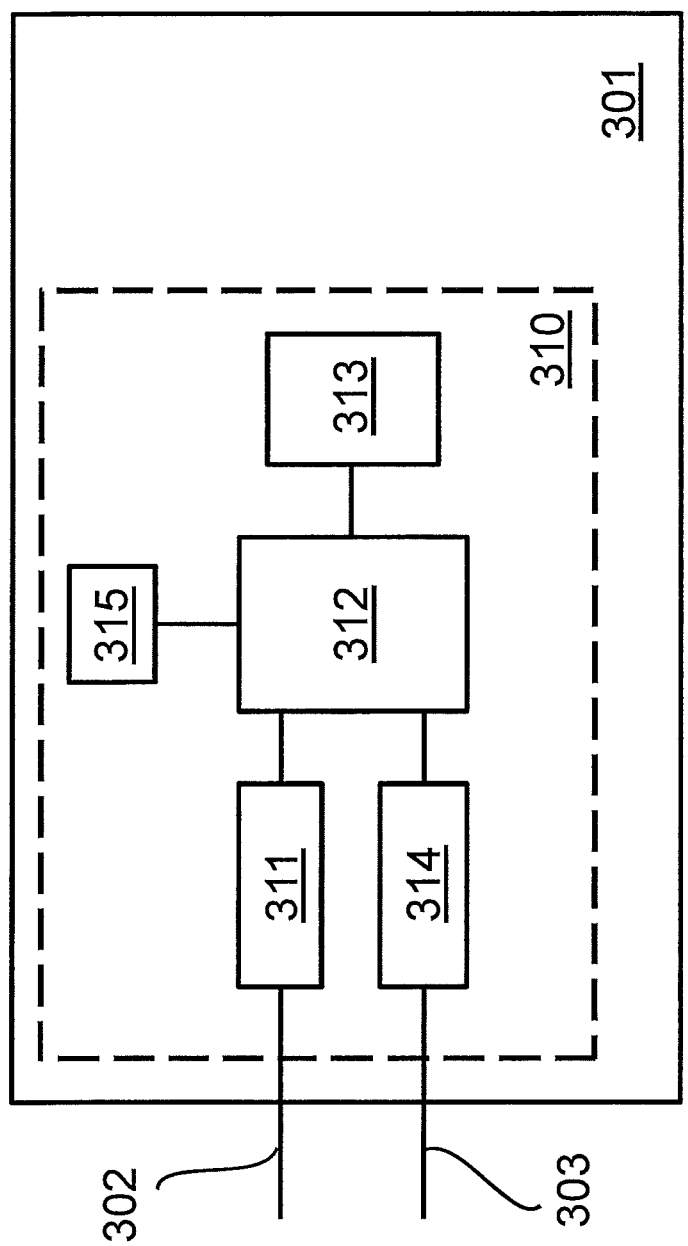
FIG. 3 schematically shows an exemplary microcontroller including hardware circuits for providing generic interfaces and a special hardware circuit for CRC calculations.

FIG. 3 shows a hardware circuit having such an additional CRC unit. Microcontroller 301 including hardware modules 310, i.e., input module 311, routing unit 312, arithmetic unit (MCS) 313 and output module 314, largely corresponds to microcontroller 101 in FIG. 1. Data input channel 302 and data output channel 303 are connected in each case to input module 311 and output module 314. In addition to microcontroller 101 of FIG. 1, microcontroller 301 also includes CRC unit 315, which in the embodiment shown is connected to routing unit 312.

The calculation of a CRC value may be based on polynomial long division. The CRC unit should therefore be configurable via parameters at least for starting the microcontroller, so that different polynomials are providable. For example, a polynomial $b7*x^7+b6*x^6+b5*x^5+b4*x^4+b3*x^3+b2*x^2+b1*x^1+b0*x^0$ may be configured using the configuration parameters b0 through b7. To be able to support different interfaces with different CRC polynomials, it must be possible either to flexibly (i.e., with regard to the propagation time) reconfigure a CRC unit or multiple CRC units must be provided.

The sequence of a data transmission including CRC calculation by a separate CRC unit is shown in FIG. 11. Here, the example of a calculation of a CRC value from received data is described.

In a first step 1101, the CRC unit is configured by the arithmetic unit (MCS) or the central processing unit (CPU) of the microcontroller. This is necessary since customarily a different polynomial must be calculated for each interface. As described above, the polynomials may be determined using configuration parameters. In a CRC module which is used for the CRC calculations of multiple generic serial interfaces, such a configuration is therefore required prior to each calculation, unless two consecutive calculations are to be carried out for the same interface. This configuration of the CRC unit may also take place, for example, by the CRC unit having access to a table including different polynomials, being transmitted an index corresponding to an entry in this table, and using the polynomial according to this entry.

In second step 1102, the CRC module receives the data for which a CRC calculation is to be carried out. For example, the data are input data having CRC information received by the input module and transmitted to the arithmetic unit (MCS). The CRC calculations are carried out in the CRC unit in third step 1103. In fourth step 1104, results of the CRC calculations (CRC check value calculation and, if necessary, verification) are sent from the CRC module to the arithmetic unit (MCS) (CRC check value and/or result of the CRC verification). The transmission of these data from the arithmetic unit (MCS) to the CRC unit and from the CRC unit to the arithmetic unit (MCS) in each case may be carried out via the routing unit.

Finally, in fifth step 1105, the arithmetic unit (MCS) may compare the CRC information calculated by the CRC unit to the received CRC information and the result of the CRC verification may be evaluated by the CRC unit, and in the case of a deviation, it may thus establish that a transmission or memory error exists.

In an optional sixth step 1106, the arithmetic unit (MCS) may trigger a new transmission if the arithmetic unit (MCS) established a transmission or memory error.

The CRC calculation for the data to be sent takes place analogously. Data are sent from the arithmetic unit (MCS) via the routing unit to the CRC unit, which may be after configuration of the CRC unit. A CRC calculation is carried out there, and the result is transmitted from the CRC unit via the routing unit to the arithmetic unit (MCS). There, the CRC value is added to the data, and the data are made available to the output module.

According to the basic configuration (FIG. 1), the exemplary embodiments described so far are based on the assumption that the hardware circuit for providing generic, serial interfaces uses an output module having a compare functionality. In another embodiment variant, however, a deviating output module without a compare functionality may also be used. Such a special module for outputting interface frames thus deviates from the above-described output modules (TOM, ATOM) of the hardware circuit and of the timer module.

The hardware implementation of such an output hardware module may take place with the aid of a state machine in combination with a memory, for example. Instead of the bit stream to be received and to be sent, as described above, the special output module may store an entire message frame in its memory. The routing unit is thus able to send the entire message to the output module using one sending operation. The higher hardware requirements in regard to the output unit thus relieve the routing unit. In addition, it is easier to achieve higher baud rates for the output of data when using such an output unit, since this unit is no longer limited by the clocking of the routing unit.

In one specific embodiment, the output unit must once again have time information (or corresponding angle information) available. Contrary to the above-described output unit, this output unit only requires the information at which point in time (or at which angle) and at which baud rate the entire message or the entire message frame must be sent. The data are then sent based on the available time or angle information and the baud rate which is known to the output module. The data from the arithmetic unit (MCS) or from the central processing unit (CPU) of the microcontroller may be written directly into the memory of the output unit. The output unit receives the signal (datum) as well as information about the data rate and the sending point in time.

As an alternative, instead of via time information, the sending process to the special output unit may also be initiated by a concrete trigger of the arithmetic unit (MCS) or of the central processing unit (CPU) of the microcontroller. The output unit then independently applies the data to the output pin.

Figure 4:
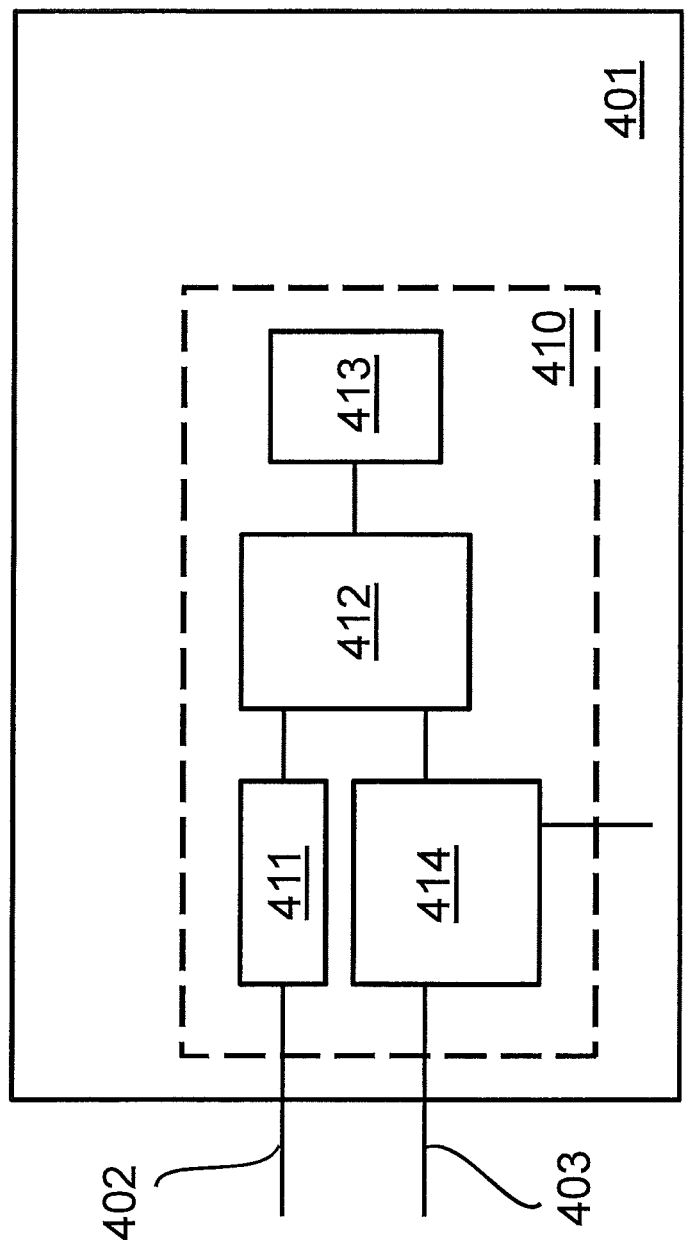
FIG. 4 schematically shows an exemplary microcontroller including hardware circuits for providing generic interfaces and a special output module.

FIG. 4 shows a microcontroller having a special output module 414. Microcontroller 401 including hardware components 410, i.e., input module 411, routing unit 412, arithmetic unit (MCS) 413 and output module 414, as well as the links to input data channel 402 and output data channel 403, once again largely corresponds to microcontroller 101 of FIG. 1. However, output module 414 has an increased functionality, such as memory resources for storing a complete message frame. In the shown specific embodiment, output module 414 additionally has a further link to microcontroller 401. Via this link, for example, data may be made available to output module 414 by the central processing unit (CPU) of microcontroller 401, such as by the above-described direct writing of the output data into the memory of output module 414 by the central processing unit (CPU).

The sequence of a data output with the aid of such a special output unit is described hereafter based on one exemplary transmission via a generic interface having a UART configuration:

1. The central processing unit (CPU) of the microcontroller or the arithmetic unit (MCS) writes the message frame 01111111111 into a memory of the output unit. This corresponds to one start bit (0), 8 data bits (11111111), one parity bit (1, in the case of odd parity), and one stop bit (1).

2. The central processing unit (CPU) of the microcontroller or the arithmetic unit (MCS) writes the data rate of the message frame to be output into a register of the output unit.

3. The central processing unit (CPU) of the microcontroller or the arithmetic unit (MCS) sends a trigger to the output unit in order to start the transmission. In one further variant, the transmission starts after receipt of the message frame after a predefined number of transmission processes. In one further variant, the central processing unit (CPU) of the microcontroller or the arithmetic unit (MCS) transmits a point in time at which the transmission is to take place or start.

4. The output unit independently outputs the message frame at the selected data rate.

In the described exemplary embodiments having a special output unit, an additional load is applied to the arithmetic unit (MCS) or the central processing unit (CPU), such as by writing of the information into the output unit and triggering of the sending process. In one further advantageous embodiment variant, the output unit thus receives the data or message frames to be sent by automatic reloading from a memory. For example, such automatic reloading may take place from a RAM to which the output unit has access via linked lists and direct memory access (DMA). It is thus also possible to output larger data packets at high speeds without loading (interrupts) of the arithmetic unit (MCS) or central processing unit (CPU) of the microcontroller.

In the described exemplary embodiments having the special output unit, it is initially assumed that the remaining method steps (data reception by the input module, routing by the routing unit, protocol calculation by the arithmetic unit (MCS), if necessary CRC calculation by the CRC unit) still take place as described above, and that the remaining hardware circuit (input module, routing unit, arithmetic unit (MCS), if necessary CRC unit) is still composed as described above.

In one further variant of the hardware circuit for providing generic serial interfaces, the above-described specific embodiments additionally include a further hardware component, which is used for message arbitration. The component assumes time-critical functions for which the remaining circuit parts are not optimally usable due to their structure and clock frequency.

This may be a component which is used to support a CAN arbitration. For the CAN arbitration, it must be detected within an internal processing time (IPT) of a few nanoseconds at an accordingly high data rate that a dominant level is present on the bus. With a dominant level on the bus, the interface is not allowed to drive a dominant level for the next bit (in the next clock section) if a recessive bit exists in the present bit (in the present clock section) in the interface. In this case, the interface (and thus the corresponding CAN node) is withdrawn from the arbitration since another CAN node has a message of higher priority (i.e., having an earlier dominant level). The hardware components described above by way of example with respect to FIG. 1 are not optimal for this functionality. Faster response times are achievable using a module which is specifically intended for this.

Figure 7:
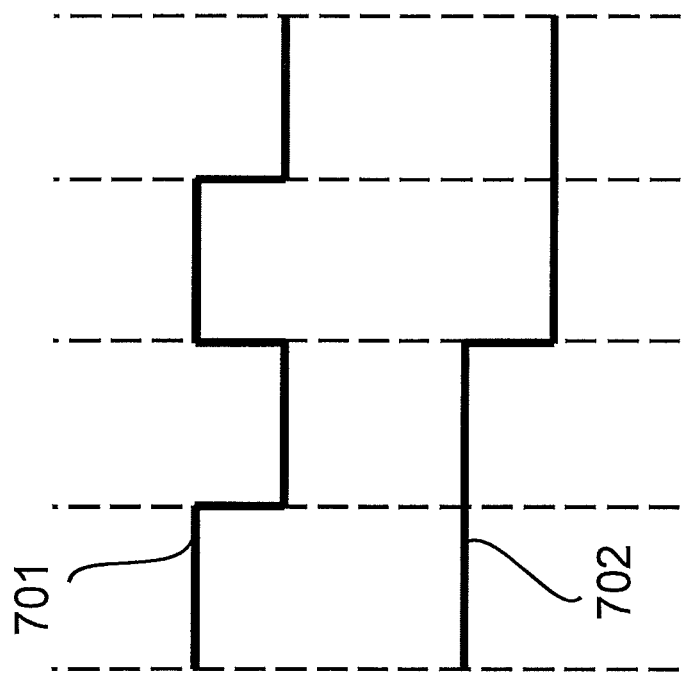
FIG. 7 schematically shows two exemplary signal characteristics including edge changes for explaining a CAN arbitration.

To illustrate the CAN arbitration, signal 701 present on the CAN bus and signal 702, which is to be sent and present internally in the microcontroller, are shown in FIG. 7. From left to right, four clock sections are delimited by dotted lines. In clock section 1, a recessive level is present both on the bus and as the internal signal. In clock section 2, a dominant level is present on the bus, the internal signal having a recessive level for this clock section. This node is thus withdrawn from the arbitration. The hardware unit for arbitration thus suppresses a driving of the intended dominant level in clock section 3. Accordingly, the node is also no longer permitted to send in clock section 4 and the following clock sections, until the end of the particular transmission on the CAN bus which won the arbitration.

Figure 6:
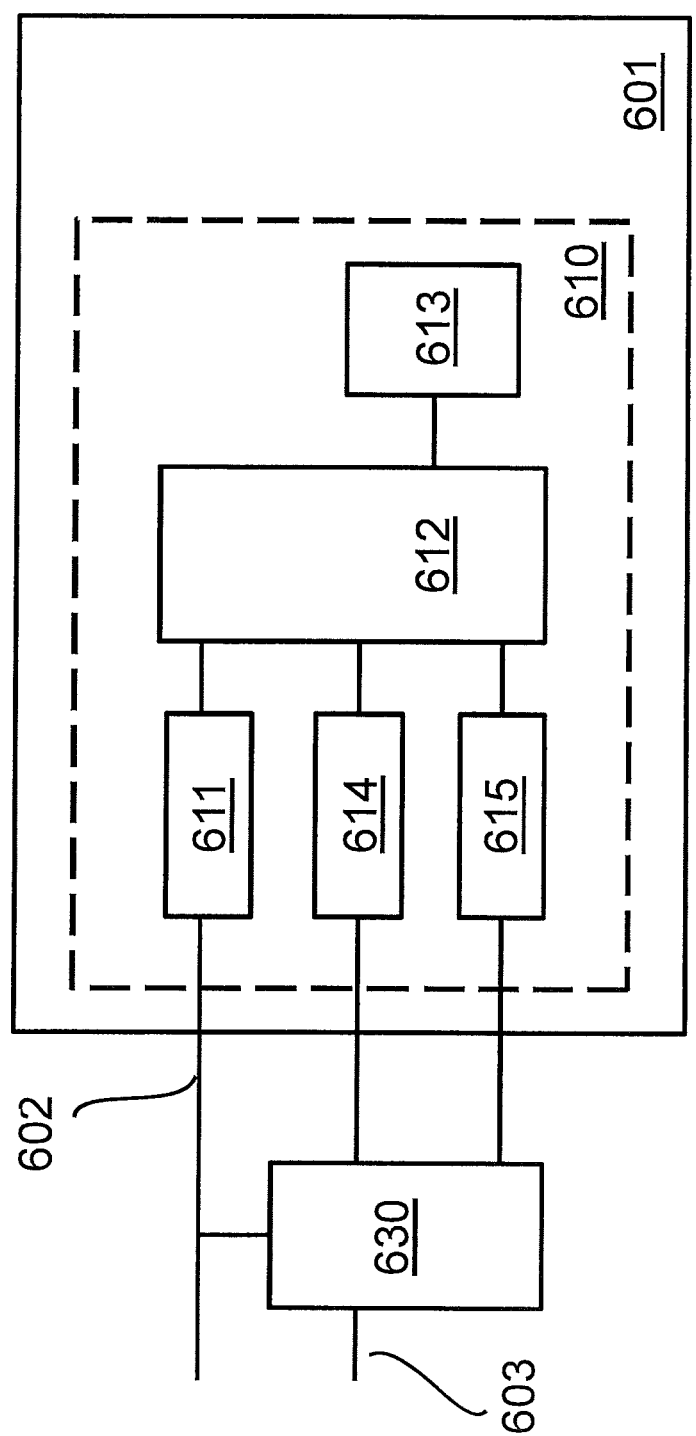
FIG. 6 schematically shows an exemplary microcontroller including hardware circuits for providing generic interfaces and a circuit for supporting arbitration.

FIG. 6 shows a microcontroller 601 including hardware modules 610 for providing a generic serial interface, in particular a CAN interface, and having an additional hardware unit 630 for the arbitration of messages via this interface. Microcontroller 601 including hardware components 610, i.e., input module 611, routing unit 612, arithmetic unit (MCS) 613 and output module 614, once again largely corresponds to microcontroller 101 in FIG. 1. However, microcontroller 601 is additionally connected to the (in the present example external) hardware module for arbitration 630. Input data channel 602 is in particular a CAN Rx line. Output data channel 603 is a CAN Tx line. Additional hardware unit 630 may be an external logic circuit which deactivates the sending of the node as soon as a corresponding signal is received. In the case of a CAN arbitration, such a send interruption would need to be carried out, for example, as soon as a dominant level is present on the bus and the host information for the same clock unit is recessive. Module 630 may be implemented, for example, as a logic circuit with the aid of gate functions, a programmable logic device (PLD) or a field programmable gate array (FPGA).

FIG. 6 additionally shows a second output module 615. This module may support the additional hardware unit for arbitration 630 by providing timer resources. Such resources are required, for example, to wait for a certain bit length or adhere to a certain pause. An alternative implementation would be to provide these timer resources also as an additional hardware circuit.

The additional hardware unit for arbitration may be flexibly assignable to different output modules with the aid of a configurable logic circuit. However, fixed assignment is also possible.

The additional hardware unit for arbitration may be present as a programmable logic circuit (e.g., FPGA or CPLD) outside the microcontroller. By integrating such programmable logic circuits, however, an alternative implementation on the microcontroller is also possible.

The special hardware unit for arbitration may be configured with additional measuring and evaluation functions. In one variant, such a unit for CAN arbitration also detects, for example, whether the protocol used is CAN or CAN-FD (CAN having a flexible data rate).

In the described exemplary embodiments having the special hardware unit for the arbitration, it is initially assumed that the remaining method steps (data input in the input module, data output by the output module, routing by the routing unit, protocol calculation by the arithmetic unit (MCS), if necessary CRC calculation by the CRC unit) still take place as described above, and that the remaining hardware circuit (input module, output module, routing unit, arithmetic unit (MCS), if necessary CRC unit) is still composed as described above for FIG. 1. However, the special hardware unit for arbitration is also easily combinable with the exemplary embodiments having the special input module and/or special output module.

In one further variant, a baud rate detection may additionally be implemented in the afore-described specific embodiments. Such a baud rate detection would allow an adaption to different baud rates, for example.

The baud rate detection may be implemented in software or hardware. With a software implementation, a baud rate detection may be carried out by the arithmetic unit (MCS) or the central processing unit (CPU) of the microcontroller from the capture information of the input module, for example. An input frequency of data may be surveyed and the baud rate may be ascertained by reproducing a reference frequency. For this purpose, entire message frames must be analyzed, which is time-consuming in a software implementation.

In one alternative embodiment, the baud rate detection is carried out in hardware. This may take place either in an additional hardware circuit or in a special input module configured with a corresponding additional functionality, as is described above (e.g., for FIG. 5). Compared to the software implementation, a faster baud rate detection and adaption is possible with a hardware implementation; additionally the arithmetic unit (MCS) or central processing unit (CPU) is relieved.

Figure 10:
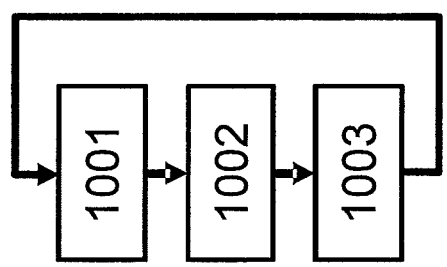
FIG. 10 schematically shows the exemplary sequence of a method for baud rate detection.

FIG. 10 shows a corresponding flow chart for the baud rate detection implemented in hardware using the example of a generic UART interface.

The basic configuration of a message frame in the provided protocol is known, for example, it is known in the present example that a message frame always starts with a start bit having a low level and ends with a stop bit having a high level. In a first step 1001 for ascertaining the baud rate, a number of clocks between the start bit and the stop bit (i.e., the first high-low edge to the last low-high edge) is counted by the corresponding hardware functionality. The clock number may be derived from a time base which provides the hardware functionality with a clock (e.g., from a time base unit) and which is small compared to the baud rate to be read in.

The length (i.e., number of bits) of the message frame is known to the hardware functionality. For the protocol assumed by way of example, it shall be known that a message frame has ten bits (e.g., start bit, eight data bits, stop bit). The ascertained number of elapsed clocks from the start bit to the stop bit is divided by the number of bits of a message frame (by ten in the example) in second step 1002. The baud rate thus ascertained may be transmitted in third step 1003, e.g., to the arithmetic unit (MCS) or the central processing unit (CPU) of the microcontroller.

While, for example, in the case of a UART or LIN interface to be provided, the frame length may always be constant and thus known, in the case of CAN, for example, the length (i.e., the number of bits) of the message frame may be unknown. In one variant of the described baud rate detection, the baud rate is also detectable in hardware. For example, it is possible to ascertain the shortest time between two bits of one message frame.

For the detection of the baud rate, the start and the end of a message frame must be ascertainable. For example, this may be carried out by an established number of clocks, such as three clocks (at a constant baud rate corresponding to a fixed time, e.g., 150 ns) for a certain level.

What is claimed is:

1. A method for providing at least one generic interface in a control unit, the control unit having a microcontroller, the method comprising:
   receiving input data according to a protocol of one of multiple serial interfaces via at least one interface-unspecific input module, an entire input message frame of the input data being stored in the at least one interface-unspecific input module in a dedicated memory of the interface-unspecific input module;
   making the stored, entire input message frame of the input data available to at least one arithmetic unit as a single message via a routing unit, wherein the arithmetic unit is separate from the interface-unspecific input module and connected thereto by the routing unit;
   extracting, by the at least one arithmetic unit, first payload data from the input data, in particular by removing specifics of the protocol from the input data;
   making the first payload data available to the central processing unit (CPU);
   receiving, by the at least one arithmetic unit, second payload data of the central processing unit (CPU);
   generating, by the at least one arithmetic unit, output data from the second payload data, in particular by adding specifics of the protocol to the second payload data;
   transmitting the output data via the routing unit to the at least one interface-unspecific output module; and
   sending the output data corresponding to the protocol of the one of the multiple serial interfaces via the at least one interface-unspecific output module,
   wherein the microcontroller includes the central processing unit (CPU), the at least one interface-unspecific input module, the at least one interface-unspecific output module, the at least one routing unit and the at least one arithmetic unit for processing interface-specific information, and
   wherein the at least one generic interface is configurable to provide functions corresponding to one of multiple serial interfaces depending on the configuration.

2. The method of claim 1, wherein the input message frame is analyzed by the at least one interface-unspecific input module with the aid of oversampling.

3. The method of claim 2, wherein a level of a bit of the input message frame is determined with the aid of voting via bit levels based on level values at sampling points of the oversampling.

4. The method of claim 3, wherein the voting is carried out by a voting instance of the input module which is implemented in hardware.

5. The method of claim 3, wherein the input module ascertains a piece of voting information about how clear the voting was and makes this available to the arithmetic unit or the central processing unit.

6. The method of claim 1, wherein the input message frame is assigned a time stamp in the at least one interface-unspecific input module.

7. The method of claim 6, wherein the time stamp assigned to the input message frame is made available to the arithmetic unit.

8. The method of claim 1, wherein a baud rate detection is carried out for the input data.

9. The method of claim 8, wherein the baud rate detection for the input data is carried out by the at least one interface-unspecific input module.

10. The method of claim 1, wherein the arithmetic unit has access to a first memory, and the protocol specifics, in particular information about one of start bits, stop bits, parity information, control bits and stuffing bits, are stored in the first memory.

11. The method of claim 10, wherein the protocol specifics are stored by the central processing unit (CPU) in the first memory.

12. The method of claim 1, wherein the at least one interface-unspecific input module and the at least one interface-unspecific output module are fixedly assigned to the one of the multiple serial interfaces with the aid of the configuration.

13. The method of claim 1, wherein the arithmetic unit also carries out calculations of higher protocol layers, in particular the conversions of multiple UART message frames into one LIN message frame.

14. The method of claim 1, wherein the first payload data are made available to the central processing unit (CPU) by the arithmetic unit writing the first payload data into a second memory and the central processing unit (CPU) being informed about this with the aid of an interrupt.

15. The method of claim 1, wherein the first payload data are made available to the central processing unit (CPU) by the arithmetic unit via direct memory access (DMA).

16. The method of claim 1, wherein the arithmetic unit generates the output data from the second payload data by determining corresponding edge changes of the output data having assigned time stamps based on a predefined baud rate.

17. The method of claim 16, wherein the output data are transmitted to the at least one interface-unspecific output module by each of the edge changes of the output data having assigned time stamps being transmitted separately via the routing unit.

18. The method of claim 16, wherein the at least one interface-unspecific output module compares the assigned time stamps of each of the edge changes of the output data to time information and, if they agree, applies the corresponding edge to an output of the microcontroller.

19. A microcontroller for a vehicle control unit, comprising:
   a microcontroller arrangement, including:
   a central processing unit (CPU);
   at least one interface-unspecific input module;
   at least one interface-unspecific output module;
   at least one routing unit; and
   at least one arithmetic unit for processing interface-specific information, wherein the inter-face unspecific input module is separate from the arithmetic unit and connected thereto by the routing unit;

wherein the microcontroller arrangement is for providing at least one generic interface in a control unit, by performing the following:

receiving input data according to a protocol of one of multiple serial interfaces via the at least one interface-unspecific input module, an entire input message frame of the input data being stored in the at least one interface-unspecific input module in a dedicated memory of the interface-unspecific input module;

making the stored, entire input message frame of the input data available to the at least one arithmetic unit as a single message via the routing unit;

extracting, by the at least one arithmetic unit, first payload data from the input data, in particular by removing specifics of the protocol from the input data;

making the first payload data available to the central processing unit (CPU);

receiving, by the at least one arithmetic unit, second payload data of the central processing unit (CPU);

generating, by the at least one arithmetic unit, output data from the second payload data, in particular by adding specifics of the protocol to the second payload data;

transmitting the output data via the routing unit to the at least one interface-unspecific output module; and sending the output data corresponding to the protocol of the one of the multiple serial interfaces via the at least one interface-unspecific output module;

wherein the at least one generic interface is configurable to provide functions corresponding to one of multiple serial interfaces depending on the configuration.

20. A microcontroller for a control unit, comprising:
a microcontroller arrangement, including:
a central processing unit (CPU);
at least one interface-unspecific input module;
at least one interface-unspecific output module;
at least one routing unit; and
at least one arithmetic unit for processing interface-specific information, wherein the at least one arithmetic unit is separate from the interface-unspecific input module and connected thereto by the routing unit;
wherein the microcontroller arrangement is configurable so that the at least one interface-unspecific input module, the at least one interface-unspecific output module, the at least one routing unit, and the at least one arithmetic unit for processing interface-specific information fulfill the functions corresponding to exactly one of multiple serial interfaces, and
wherein the at least one interface-unspecific input module stores an entire input message frame of input data in a dedicated memory of the interface-unspecific input module and makes the stored, entire input message frame available to the at least one arithmetic unit as a single message via the routing unit.

21. The microcontroller of claim 19, wherein the dedicated memory has a memory capacity sufficient for maximally large message frames of each protocol according to the multiple serial interfaces.

22. The microcontroller of claim 19, wherein the memory is a FIFO memory.

23. The microcontroller of claim 19, wherein the arithmetic unit includes an arithmetic logic unit (ALU).

24. The microcontroller of claim 19, wherein the at least one interface-unspecific output module includes a compare functionality.

25. The microcontroller of claim 19, wherein the routing unit and/or the arithmetic unit operate at a clock of at least 100 MHz.

26. The microcontroller of claim 19, which is configured to receive input data via the at least one interface-unspecific input module at an input baud rate of at least one 1 Mbaud, and to send output data via the at least one interface-unspecific output module at an output baud rate of at least 1 Mbaud.

27. The microcontroller of claim 19, further comprising:
at least one interface-specific input module and at least one interface-specific output module, in addition to the at least one interface-unspecific input module and the at least one interface-unspecific output module.

28. The microcontroller of claim 19, further comprising:
a timer module having a timer input module, a timer output module, a timer routing unit and a timer arithmetic unit.

29. The microcontroller of claim 28, wherein the microcontroller arrangement is configured to perform timer functions of the timer module using the at least one interface-unspecific input module, the at least one interface-unspecific output module, the at least one arithmetic unit and the routing unit, if these are not required to fulfill the functions corresponding to one of the multiple serial interfaces.

30. The microcontroller of claim 20, wherein the multiple serial interfaces includes SPI, UART, LIN, CAN, PSI5, FlexRay, SENT, I2C, MSC and an Ethernet.

31. The method of claim 1, wherein the multiple serial interfaces includes SPI, UART, LIN, CAN, PSI5, FlexRay, SENT, I2C, MSC and an Ethernet.

32. The microcontroller of claim 19, wherein the multiple serial interfaces includes SPI, UART, LIN, CAN, PSI5, FlexRay, SENT, I2C, MSC and an Ethernet.

33. The microcontroller of claim 19, wherein the routing unit and/or the arithmetic unit operate at a clock of at least 200 MHz.

34. A vehicle control unit, comprising:
a microcontroller, including:
a central processing unit (CPU);
at least one interface-unspecific input module;
at least one interface-unspecific output module;
at least one routing unit; and
at least one arithmetic unit for processing interface-specific information, wherein the arithmetic unit is separate from the interface-unspecific input module and connected thereto by the routing unit;
wherein the microcontroller is configurable so that the at least one interface-unspecific input module, the at least one interface-unspecific output module, the at least one routing unit, and the at least one arithmetic unit for processing interface-specific information fulfill the functions corresponding to exactly one of multiple serial interfaces, and
wherein the at least one interface-unspecific input module stores an entire input message frame of input data in a dedicated memory of the inter-face unspecific input module and makes the stored, entire input message frame available to the at least one arithmetic unit as a single message via the routing unit.

* * * * *